United States Patent
Lehmann et al.

(10) Patent No.: US 9,243,933 B2
(45) Date of Patent: Jan. 26, 2016

(54) AMPLITUDE EVALUATION BY MEANS OF A GOERTZEL ALGORITHM IN A DIFFERENTIAL TRANSFORMER DISPLACEMENT SENSOR

(75) Inventors: Sören Lehmann, Frankfurt (DE); Frank Grunwald, Oberursel (DE)

(73) Assignee: Continental Teves AG & Co. oHG (DE)

( * ) Notice: Subject to any disclaimer, the term of this patent is extended or adjusted under 35 U.S.C. 154(b) by 44 days.

(21) Appl. No.: 14/342,850

(22) PCT Filed: Sep. 7, 2012

(86) PCT No.: PCT/EP2012/067575
§ 371 (c)(1),
(2), (4) Date: Mar. 5, 2014

(87) PCT Pub. No.: WO2013/034739
PCT Pub. Date: Mar. 14, 2013

(65) Prior Publication Data
US 2014/0203801 A1    Jul. 24, 2014

(30) Foreign Application Priority Data
Sep. 9, 2011 (DE) .......................... 10 2011 082 462

(51) Int. Cl.
*G01B 7/14* (2006.01)
*G01B 7/30* (2006.01)
(Continued)

(52) U.S. Cl.
CPC ................ *G01D 5/20* (2013.01); *G01B 11/002* (2013.01); *G01B 11/14* (2013.01); *G01B 21/16* (2013.01);
(Continued)

(58) Field of Classification Search
CPC ........ G01D 5/20; G01D 5/2266; G01P 15/00; G01P 3/00; G01P 3/44; G01B 21/22; G01B 21/16; G01B 11/14; G01B 11/002; G01B 21/045; G01C 21/00; G01C 5/00

USPC .................. 324/51, 55, 200, 207.11, 207.13, 324/207.15, 207.16, 207.17; 702/150, 151, 702/790
See application file for complete search history.

(56) References Cited

U.S. PATENT DOCUMENTS 4,599,560 A * 7/1986 Sanford et al. ........... 324/207.18
5,632,093 A * 5/1997 Elias .......................... 33/366.25
(Continued)

FOREIGN PATENT DOCUMENTS

DE       2 325 752       12/1974
DE       696 07 756 T2   8/2000
(Continued)

OTHER PUBLICATIONS

DE 2325752 Machine Translation, Dec. 12, 1974.*
(Continued)

*Primary Examiner* — Huy Q Phan
*Assistant Examiner* — Raul Rios Russo
(74) *Attorney, Agent, or Firm* — RatnerPrestia

(57) ABSTRACT

Displacement sensor arrangement including at least one primary coil, at least a first and a second secondary coil and at least one magnetically soft coupling element, which magnetically couples the primary coil and the two secondary coils, the displacement sensor being designed so that a position and/or deflection depending on the magnetic coupling between the primary coil and at least the first and second secondary coil is detected, the displacement sensor arrangement having a signal processing unit, which is designed to perform digital signal processing of at least one electrical variable of the two secondary coils and determine the position and/or deflection, the signal processing unit having at least one Goertzel filter.

12 Claims, 6 Drawing Sheets

(51) Int. Cl.

| | |
|---|---|
| *H01F 5/00* | (2006.01) |
| *G01D 5/20* | (2006.01) |
| *G01B 11/14* | (2006.01) |
| *G01P 15/00* | (2006.01) |
| *G01B 21/16* | (2006.01) |
| *G01P 3/44* | (2006.01) |
| *G01B 11/00* | (2006.01) |
| *G01B 21/22* | (2006.01) |
| *G01P 3/00* | (2006.01) |
| *G01D 5/22* | (2006.01) |
| *G01C 9/00* | (2006.01) |
| *G01B 21/04* | (2006.01) |

(52) U.S. Cl.
CPC .............. *G01B 21/22* (2013.01); *G01D 5/2266* (2013.01); *G01P 3/00* (2013.01); *G01P 3/44* (2013.01); *G01P 15/00* (2013.01); *G01B 21/045* (2013.01)

(56) References Cited

U.S. PATENT DOCUMENTS

| | | | |
|---|---|---|---|
| 5,818,296 A | 10/1998 | Lee et al. | |
| 6,346,870 B1 * | 2/2002 | Bill et al. | 336/198 |
| 7,248,994 B1 | 7/2007 | Stolan | |
| 2003/0086194 A1 * | 5/2003 | Ottesen et al. | 360/31 |
| 2009/0030646 A1 * | 1/2009 | Jones | A61B 19/5244 |
| | | | 702/150 |
| 2009/0076746 A1 * | 3/2009 | Higgins | A61B 5/06 |
| | | | 702/57 |
| 2012/0261895 A1 | 10/2012 | Cote et al. | |
| 2013/0278914 A1 * | 10/2013 | Demarest | G01B 11/14 |
| | | | 355/72 |

FOREIGN PATENT DOCUMENTS

| | | |
|---|---|---|
| DE | 697 23 706 T2 | 6/2004 |
| DE | 10 2007 030 598 A1 | 1/2009 |
| DE | 10 2008 029 839 A1 | 12/2009 |
| EP | 0 238 922 A1 | 9/1987 |
| EP | 0 693 673 A2 | 1/1996 |

OTHER PUBLICATIONS

International Search Report for International Application No. PCT/EP2012/067575 mailed Jan. 4, 2013.
Written Opinion of the International Searching Authority for PCT/EP2012/067575 dated Jan. 4, 2013 (w/English translation).
German Search Report for 10 2012 215 940.1 dated Nov. 27, 2012.
Shlomo Engelberg: "Digital Signal Processing" Dec. 31, 2008, p. 203.

* cited by examiner

AMPLITUDE EVALUATION BY MEANS OF A GOERTZEL ALGORITHM IN A DIFFERENTIAL TRANSFORMER DISPLACEMENT SENSOR

CROSS REFERENCE TO RELATED APPLICATIONS

This application is the U.S. National Phase Application of PCT/EP2012/067575, filed Sep. 7, 2012, which claims priority to German Patent Application No. 10 2011 082 462.6, filed Sep. 9, 2011, the contents of such applications being incorporated by reference herein.

FIELD OF THE INVENTION

The invention relates to a displacement sensor arrangement and the use of the displacement sensor arrangement in motor vehicles.

BACKGROUND OF THE INVENTION

Magnetic displacement sensor arrangements with a primary coil and two secondary coils, with which a soft magnetic coupling element is associated, which is locally influenced by the magnetic field of a position encoder magnet for displacement measurement such that the relative position between the position encoder magnet and the coupling element can be determined, are described in the documents EP 0 693 673 A2, EP 0 238 922 A1 and DE 2 325 752, which are incorporated by reference.

Moreover, differential transformer displacement sensors are known. These are available e.g. in the form of LVDTs, "Linear Variable Differential Transformers", wherein a soft magnetic core of the primary and secondary side coils is displaced and the displacement deflection of said soft magnetic core is recorded.

For digital displacement measurement it is known to digitize the electrical alternating voltage on the first and the second secondary coils and to digitally analyze it depending on the frequency of the excitation current or the excitation voltage through/on the primary coil(s) and thereby to determine the position or deflection or the displacement to be recorded.

SUMMARY OF THE INVENTION

An aspect of the invention proposes a displacement sensor arrangement that carries out a digital analysis of at least one electrical variable of the two secondary coils and thereby records the position and/or deflection or the displacement to be recorded depending on the electrical excitation of the primary coil in a relatively simple and/or inexpensive manner.

This is achieved according to an aspect of the invention by the displacement sensor arrangement comprising at least one primary coil, at least one first and one second secondary coil and at least one soft magnetic coupling element, which magnetically couples the primary coil and the two secondary coils, wherein the displacement sensor is designed such that a position and/or a deflection is recorded depending on the magnetic coupling between the primary coils and at least the first and second secondary coils, wherein the displacement sensor arrangement comprises a signal processing unit, which is designed such that it carries out digital signal processing of at least one electrical variable of the two secondary coils and determines the position and/or deflection, wherein the signal processing unit comprises at least one Goertzel filter.

The electrical variable on the two secondary coils is preferably understood to mean the respective electrical voltage on the first and second secondary coils.

It is preferred that the displacement sensor arrangement comprises at least one first displacement element, comprising at least one first position encoder magnet, wherein the first displacement element is disposed to be displaceable along a measurement direction relative to the soft magnetic coupling element, and the primary coil and the secondary coils are magnetically coupled to the soft magnetic coupling element and wherein the magnetic field generated by the first position encoder magnet influences the coupling element at least locally such that the relative position between the first displacement element and the soft magnetic coupling element or the deflection or the displacement of the displacement element is directly or indirectly detected by at least one of the secondary coils.

The position encoder magnet is preferably understood to mean a permanent magnet and alternatively preferably to mean an electromagnet.

Alternatively, the displacement sensor arrangement is preferably in the form of a differential transformer displacement sensor, especially of an LVDT, "Linear Variable Differential Transformer", wherein the soft magnetic coupling element is designed to be displaceable and the position and/or deflection of said coupling element is recorded.

It is advantageous that the displacement sensor arrangement is designed as follows: displacement sensor arrangement, comprising at least one primary coil, at least two secondary coils, at least one soft magnetic coupling element and at least one first displacement element, comprising at least one first position encoder magnet, wherein the first displacement element is disposed to be displaceable along a measurement direction relative to the soft magnetic coupling element, and the primary coil and the secondary coils are magnetically coupled to the soft magnetic coupling element and wherein the magnetic field generated by the first position encoder magnet influences the coupling element at least locally such that the relative position between the first displacement element and the soft magnetic coupling element is directly or indirectly detected by at least one of the secondary coils, wherein the displacement sensor arrangement comprises a signal processing unit, which is designed such that it carries out digital signal processing of at least one electrical variable of the two secondary coils and determines the relative position between the first displacement element and the soft magnetic coupling element, wherein the signal processing unit comprises at least one Goertzel filter.

It is preferred that the signal processing unit is designed such that with the at least one Goertzel filter the at least one electrical variable of the two secondary coils is assessed and/or analyzed depending on the electrical excitation signal of the primary coil, wherein especially the center frequency of the at least one Goertzel filter essentially corresponds to the frequency of the excitation voltage and/or of the excitation current on/through the primary coil.

It is advantageous that the signal processing unit comprises at least one Goertzel filter for assessing and/or analyzing the at least one electrical variable of the first and of the second secondary coil respectively.

The signal processing unit preferably comprises at least one analog-to-digital converter, with which the at least one electrical variable of the two secondary coils is digitized as a first digital secondary coil signal and as a second digital secondary coil signal, wherein the signal processing unit comprises a window function, especially a Hanning window function, with which windowing of the first and of the second digital secondary coil signals is conducted. It is particularly preferred that the signal processing unit is designed such that following the windowing of the first and of the second digital secondary coil signals, at least said two signals are each filtered by a Goertzel filter, after which summation and differencing of the result of the Goertzel filter is carried out, following which the quotient of the difference signal divided by the summation signal is formed.

The Goertzel filter is preferably designed such that it performs band filtering with respect to a center frequency and decimation.

By means of the preferable windowing with a window function, e.g. the Hanning window, there is moreover especially the possibility of computer analysis of interfering side frequencies. If the amplitude ratio of the sidebands and the center frequency is not conformant then the signal can suffer interference.

It is preferred that the signal processing unit comprises a clock generator unit, wherein both the excitation voltage and/or the excitation current on/through the primary coil are generated depending on a clock signal of said clock generator unit and also the center frequency of the at least one Goertzel filter are defined.

The displacement sensor arrangement is preferably of a redundant design and preferably comprises two first secondary coils and two second secondary coils, which are connected to the signal processing unit or each of which is connected to a signal processing unit.

It is preferred that the at least one Goertzel filter is designed such that it filters with respect to a single frequency.

It is advantageous that the at least one Goertzel filter is designed such that it acts as a decimation bandpass filter.

The displacement sensor arrangement preferably comprises an additional second soft magnetic coupling element, especially fixedly disposed, which is designed and disposed such that it is used to improve the return magnetic path of the magnetic field through the first soft magnetic coupling elements and the coils.

The soft magnetic coupling element, especially that directly coupled to the coils, preferably comprises a longitudinal extension, relative to which it is disposed essentially parallel to the measurement direction of the displacement sensor arrangement.

The two secondary coils are preferably disposed at both ends of the winding body of the primary coil relative to the measurement direction.

It is preferred that the first position encoder magnet is part of the associated displacement element, wherein the displacement element is especially in the form of a piston, and/or that the first position encoder magnet is let into and/or fixed to the displacement element, especially a piston.

The displacement element is preferably in the form of a piston or actuating element or actuating rod and is especially used for force transfer.

The displacement sensor arrangement is advantageously part of a motor vehicle brake system, wherein the (first) displacement element, comprising the first position encoder magnet, is coupled and/or connected to an actuating device or a brake pedal device.

The at least three coils, a primary coil and at least first and second secondary coils, advantageously enclose the soft magnetic coupling element and are especially designed and disposed to be directly wound thereon and are thereby particularly preferably encapsulated with an electrically insulating material or fixed by a lacquer.

The primary coil is preferably connected to an alternating current source or alternating voltage source, which drives an alternating current or an alternating voltage with essentially constant amplitude of the current or the voltage and a defined alternating frequency.

A Goertzel filter is preferably understood to mean an electronic unit and/or a software unit, which has implemented a Goertzel algorithm.

A Goertzel filter or Goertzel algorithm is preferably understood to mean a 1-point discrete Fourier transformation, according to a defined algorithm, which produces the amplitude of the supplied signal as a result. The phase information can especially be omitted. In contrast to FFT, Fast Fourier Transformation, the Goertzel algorithm can always be employed if a known, discrete frequency is to be analyzed. This is the case in the displacement sensor arrangement. A steep-edged, frequency selective amplitude computation can thus especially take place in a simple, inexpensive µC.

The displacement sensor arrangement is preferably designed such that the primary coil is stimulated by at least two different overlaid frequencies, i.e. a first and a second excitation frequency, and a first secondary coil, an additional first secondary coil, a second secondary coil and an additional second secondary coil, which are all magnetically coupled to the primary coil via the soft magnetic coupling element, are associated with the primary coil. First and second signal processing units, each of which comprises a Goertzel filter, are thereby respectively associated with the two first secondary coils and the two second secondary coils, wherein the Goertzel filter of the first signal processing unit comprises the first excitation frequency as the center frequency and the Goertzel filter of the second signal processing unit comprises the second excitation frequency as the center frequency. In particular, the combination of the first secondary coil and the additional first secondary coil with the first signal processing unit thus record and computes the position and/or the deflection based on the first excitation frequency, and in addition the combination of the second secondary coil and the additional second secondary coil with the second signal processing unit redundantly records and computes the position and/or the deflection based on the second excitation frequency. First and second signal processing units thereby particularly preferably both comprise a window function, e.g. a Hanning window function, which is disposed upstream of the Goertzel filter, and each especially preferably a differencing and a summation with downstream quotient formation for computing the position and/or deflection or the corresponding signal.

REFERENCE CHARACTER LIST 1 primary coil
2 soft magnetic coupling element
3 or 3a first secondary coil
3b additional first secondary coil
4 or 4a second secondary coil
4b additional second secondary coil
5 signal processing unit
6 Goertzel filter
7 position encoder magnet
8 window function, especially Hanning window function
9 summation
10 differencing
11 quotient formation
12 clock generator unit
13 A/D converter
14 electrical excitation source

BRIEF DESCRIPTION OF THE DRAWINGS

Schematic representations are shown by way of example, wherein.

DETAILED DESCRIPTION OF THE INVENTION

Figure 1:
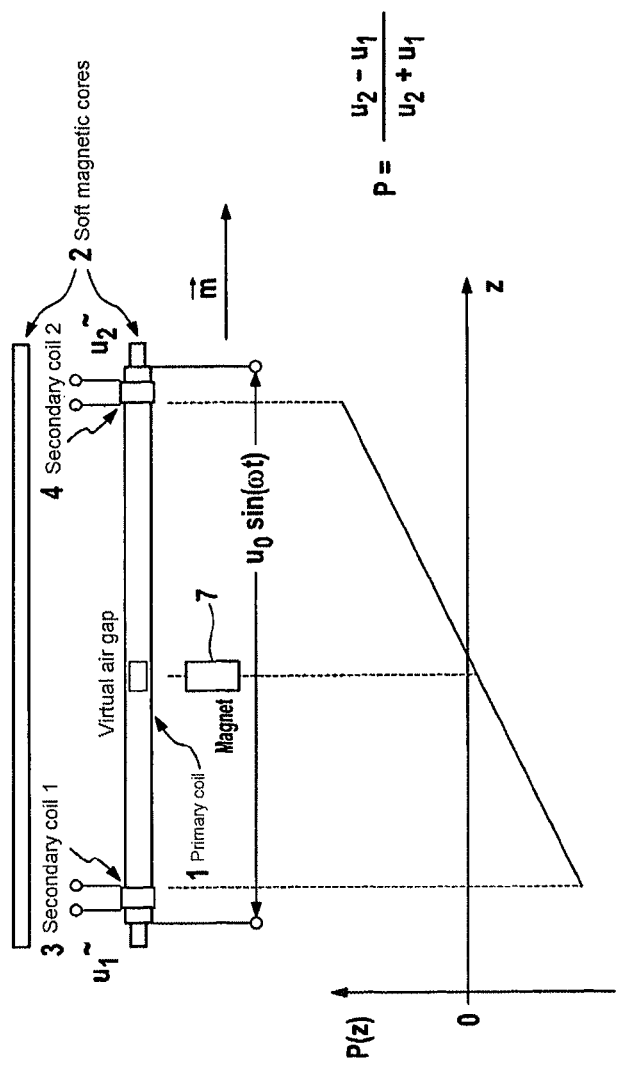
FIG. 1 shows a differential transformer displacement sensors a displacement sensor arrangement, implemented with a permanent magnet for marking or recording the displacement.
Figure 2:
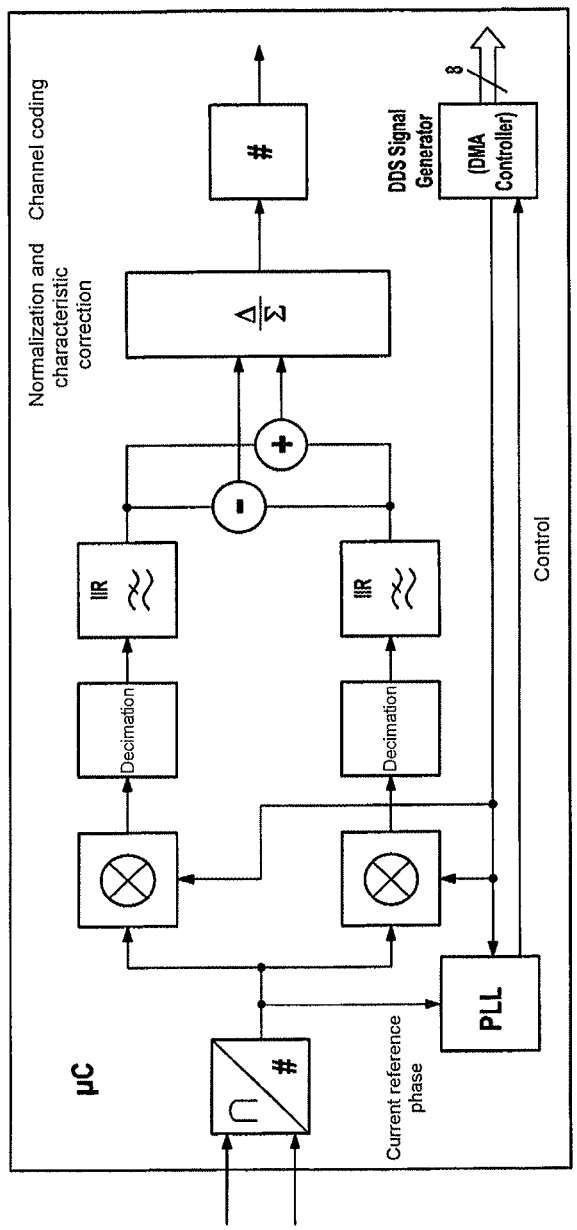
FIG. 2 shows a signal processing unit with a synchronous demodulator in a dual implementation for synchronous rectification of the transformer secondary voltages U1~, U2~, thereby an exemplary implementation with a digital signal processor, according to the prior art.

FIG. 1 shows a displacement sensor arrangement by way of example in the form of a differential transformer, in which a permanent magnet 7 is displaced as a position encoder magnet that is attached to a not illustrated displacement element, such as e.g. an actuating rod or a piston. Primary coil 1 is magnetically coupled to first and second secondary coils 3, 4 by means of soft magnetic coupling element 2, wherein the exemplary displacement sensor arrangement an additional soft magnetic coupling element, which is designed and disposed such that it is used to improve the magnetic return path of the magnetic field through the first soft magnetic coupling element 2 and the coils 1, 3 and 4.

The soft magnetic coupling element 2 comprises a longitudinal extension, relative to which it is essentially disposed parallel to the measurement direction $\vec{m}$ of the displacement sensor arrangement.

The position P of the position encoder magnet 7 or the deflection of the displacement sensor arrangement is given by the electrical signals of the two secondary coils, according to the example from the two secondary voltages U1~, U2~, wherein the position P is given, as illustrated in accordance with the formula, essentially as or dependent on the quotient of the difference divided by the sum of the two voltages U2 and U1, which are determined or computed as values of the voltages depending on the excitation frequency of the primary coil 1.

Figure 3:
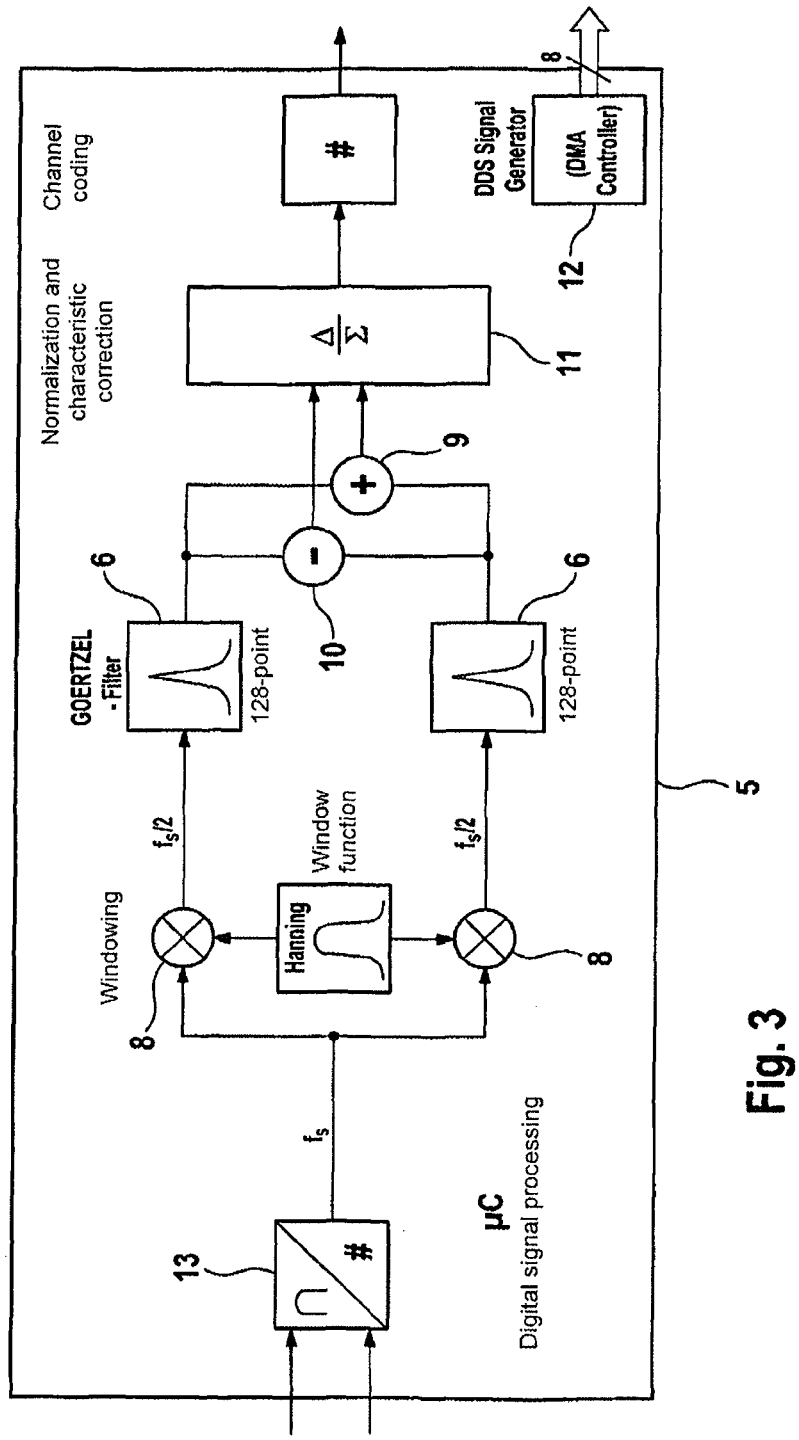
FIG. 3 shows the exemplary block diagram of the signal processing unit of the displacement sensor arrangement according to the invention with implemented Goertzel filters or Goertzel algorithm, e.g. in software.
Figure 4:
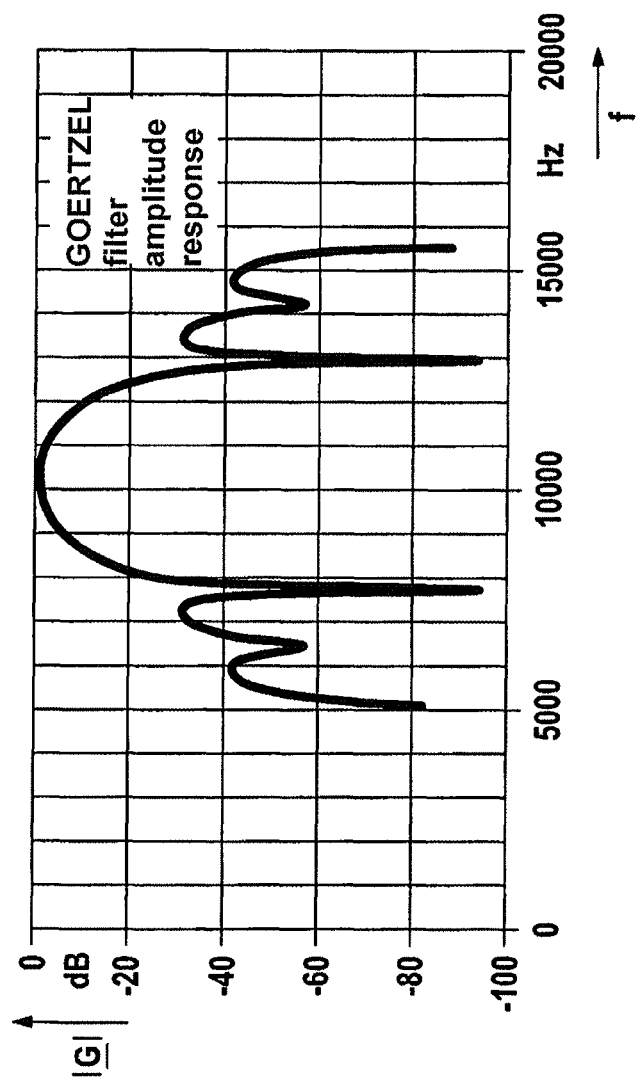
FIG. 4 shows the transmission characteristic (example configuration) as an amplitude response implemented with said displacement sensor arrangement and its signal processing circuit from FIG. 3.

FIG. 3 shows an exemplary, schematic implementation of the signal processing unit 5 of the displacement sensor arrangement in this case, by way of example in the form of a digital signal processor.

The two signals, according to the example being the voltage signals of the first and second secondary coils, are digitized as input signals by means of an analog-to-digital converter 13.

Said two digital signals are each supplied to a window function 8, according to the example a Hanning window function, with which windowing of the first and of the second digital secondary coil signals respectively—upper and lower signal path, is carried out.

Following the windowing 8 of the first and of the second digital secondary coil signals, said two signals are each filtered by a Goertzel filter 6 and the amplitude is determined, following which a summation 9 and a differencing 10 of the result of the Goertzel filter 6 respectively for the two signals is carried out, following which the quotient 11 of the difference signal divided by the summation signal is formed, wherein the formation of the quotient according to the example corresponds to a normalization. In function block 11, moreover, a characteristic correction takes place. Then channel encoding is carried out before the signal processing unit provides the output signal. The clock generator unit 12 provides both the clock for computing the center frequency of the two Goertzel filters 6 and also for computing the excitation frequency of the not illustrated primary coil. Thereby the center frequencies of the Goertzel filters 6 and the excitation frequency of the primary coil agree.

Figure 5:
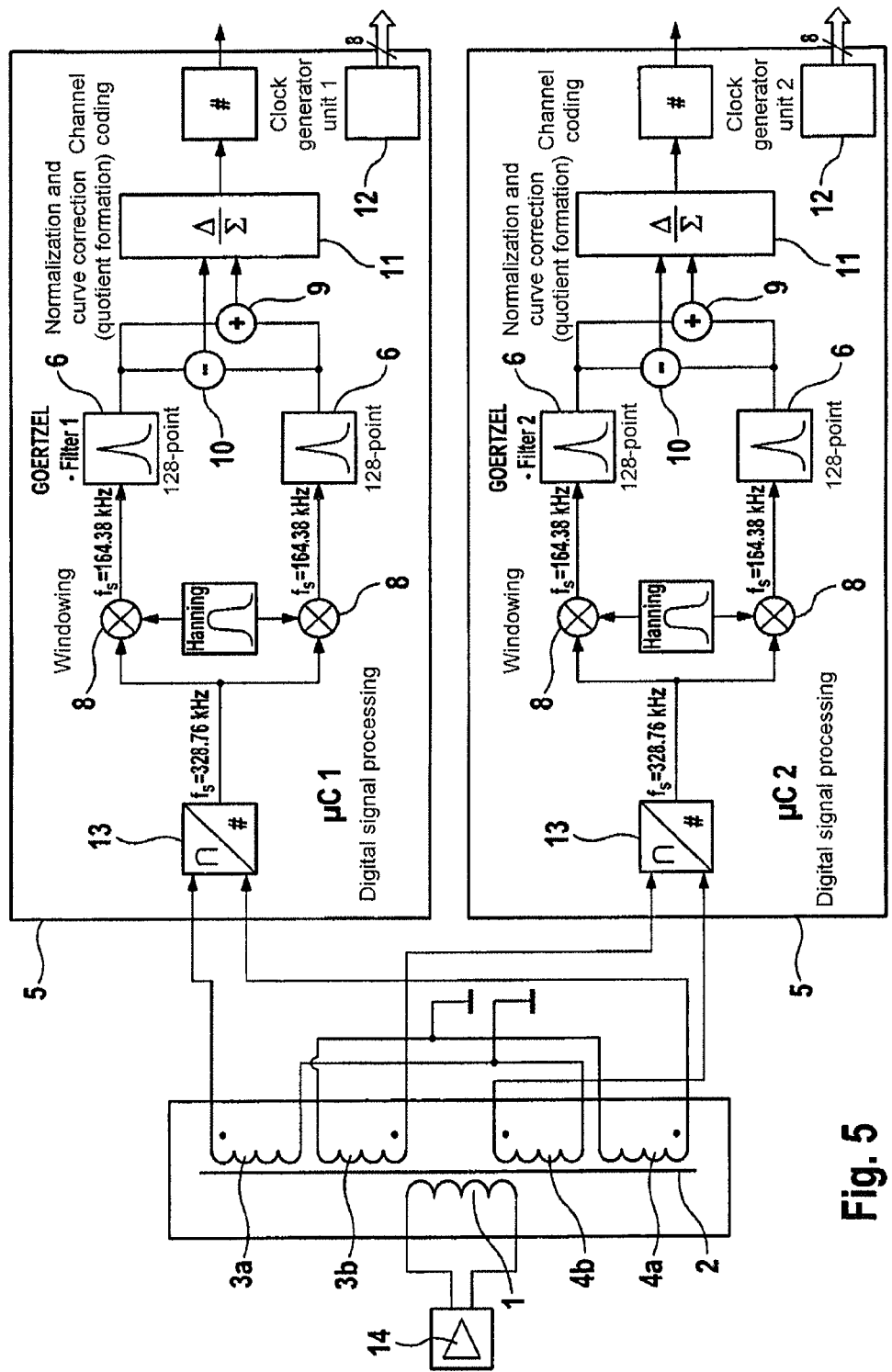
FIG. 5 shows a displacement sensor arrangement with a redundant design, in which two first and two second secondary coils are associated with the primary coil and signal processing units are respectively associated with the two first and the two second secondary coils.
Figure 6:
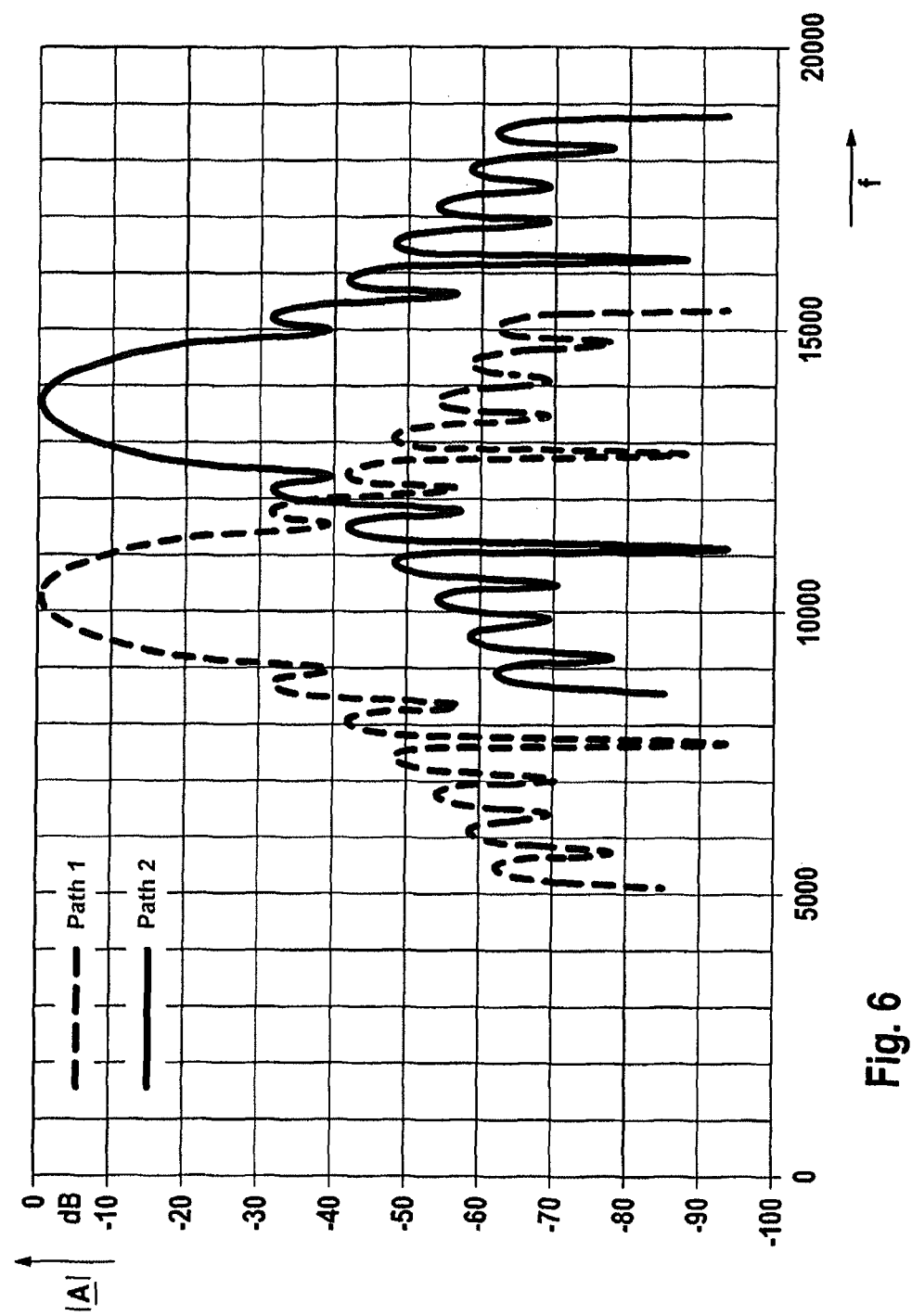
FIG. 6 shows the amplitude response of the signals of the two paths 1 and 2 filtered by means of the respective Goertzel filters, said paths being implemented as signal processing paths through the two signal processing units and said paths having different center frequencies of the Goertzel filters. As a result of the high selectivity of the filters, e.g. approx. 60 dB, fully autonomous signal processing units or signal processing paths survive unaffected, including in the event of the failure of an excitation frequency of the other path.

Using FIG. 5, an exemplary embodiment of the displacement sensor arrangement is illustrated, with which the primary coil 1 is stimulated with at least two different superimposed frequencies, i.e. a first and a second excitation frequency, by the electrical excitation source 14, by way of example an alternating voltage source. A first secondary coil 3a, an additional first secondary coil 3b, a second secondary coil 4a and an additional second secondary coil 4b are thereby associated with the primary coil 1, all of which are magnetically coupled to the primary coil 1 by means of the soft magnetic coupling element 2. Signal processing units 5, each comprising a Goertzel filter 6, are thereby respectively associated with the two first secondary coils 3a, 3b and the two second secondary coils 4a, 4b, wherein the Goertzel filter of the first signal processing unit comprises the first excitation frequency as the center frequency and the Goertzel filter of the second signal processing unit comprises the second excitation frequency as the center frequency. The combination of the first secondary coil 3a and the additional first secondary coil 3b with the first signal processing unit 5, μC 1 records and computes the position and/or the deflection based on the first excitation frequency and additionally the combination of the second secondary coil 4a and the additional second secondary coil 4b with the second signal processing unit 5, μC 2 redundantly records and computes the position and/or the deflection based on the second excitation frequency. The first and second signal processing units each comprise thereby an A/D converter 13 which digitizes the digitized signals of the first and additional first or second and additional second secondary coils. Thereafter said two signals are each—upper and lower signal paths within the signal processing unit—supplied to a window function 8, by way of example in the form of a Hanning window function, after which the resulting signals are each filtered by the Goertzel filter 6. The amplitudes, as the results of said filtered signals, are then input to differencing and summation 9 with downstream quotient formation 11 for computing the position and/or deflection or the corresponding signal, after which by way of example channel encoding takes place in each case. The clock generator units 12 of the two signal processing units 5 generate different clock signals of different frequencies, wherein the electrical excitation source 14 is operated with the superimposition of said two frequencies and the Goertzel filters of the respective signal processing units 5 each take their center frequencies from their related clock generator units 12.

The invention claimed is:

1. A displacement sensor arrangement, comprising:
   at least one primary coil, at least one first and one second secondary coil;
   at least one soft magnetic coupling element, which magnetically couples the primary coil and the two secondary coils; and
   a signal processing unit, connected to both of the two secondary coils, the signal processing unit configured to perform digital signal processing of at least one electrical variable to determine a position and/or a deflection depending on the magnetic coupling between the primary coil and at least the first and second secondary coils, by:
      digitizing electrical signals of the two secondary coils to produce the at least one electrical variable,
      windowing the electrical variable, and
      filtering the windowed electrical variable with a Goertzel filter to determine a magnitude of the electrical variable which indicates the position and/or the deflection between the primary coil and at least the first and second secondary coils.

2. The displacement sensor arrangement as claimed in claim 1, wherein the displacement sensor arrangement comprises at least one first displacement element, comprising at least one first position encoder magnet, wherein the first displacement element is disposed to be displaceable along a measurement direction ($\vec{m}$) relative to the soft magnetic coupling element, and the primary coil and the secondary coils are magnetically coupled by the soft magnetic coupling element and wherein the magnetic field generated by the first position encoder magnet influences the coupling element at least locally such that the relative position between the first displacement element and the soft magnetic coupling element is detected directly or indirectly by at least one of the secondary coils.

3. The displacement sensor arrangement as claimed in claim 1, wherein the displacement sensor is in the form of a differential transformer displacement sensor, especially of an LVDT, "Linear Variable Differential Transformer", wherein the soft magnetic coupling element is in displaceable form and the position and/or deflection of said coupling element is recorded.

4. The displacement sensor arrangement as claimed in claim 1, wherein the signal processing unit is designed such that the at least one electrical variable of the two secondary coils is assessed and/or analyzed with the at least one Goertzel filter depending on the electrical excitation signal of the primary coil, wherein especially the center frequency of the at least one Goertzel filter essentially corresponds to the frequency of the excitation voltage and/or of the excitation current on/through the primary coil.

5. The displacement sensor arrangement as claimed in claim 1, wherein the signal processing unit comprises at least one Goertzel filter respectively for assessing and/or analyzing the at least one electrical variable of the first and the second secondary coils.

6. The displacement sensor arrangement as claimed in claim 1, wherein the signal processing unit comprises at least one analog-to-digital converter, with which the at least one electrical variable of the two secondary coils is digitized as the first digital secondary coil signal and as the second digital secondary coil signal, wherein the signal processing unit comprises a window function, especially a Hanning window function, with which windowing of the first and second digital secondary coil signals respectively is carried out.

7. The displacement sensor arrangement as claimed in claim 6, wherein the signal processing unit is designed such that following the windowing of the first and of the second digital secondary coil signals, at least said two signals are each filtered by a Goertzel filter, following which summation and differencing of the result of the Goertzel filter is carried out, after which the quotient of the difference signal divided by the summation signal is formed.

8. The displacement sensor arrangement as claimed in claim 1, wherein the signal processing unit comprises a clock generator unit, wherein both the excitation voltage and/or the excitation current on/through the primary coil are generated depending on a clock signal of said clock generator unit, and also the center frequency of the at least one Goertzel filter are defined.

9. The displacement sensor arrangement as claimed in claim 1, wherein the displacement sensor arrangement is of redundant design and comprises two first secondary coils and two second secondary coils, which are connected to the signal processing unit or each of which is connected to a signal processing unit.

10. The displacement sensor arrangement as claimed in claim 1, wherein the at least one Goertzel filter is designed such that it filters with respect to a single frequency.

11. The displacement sensor arrangement as claimed in claim 1, wherein the at least one Goertzel filter is designed such that it acts as a decimation bandpass filter.

12. A use of a displacement sensor arrangement in motor vehicles, the displacement sensor comprising:
   at least one primary coil;
   at least one first and one second secondary coil; and
   at least one soft magnetic coupling element, which magnetically couples the primary coil and the two secondary coils; and
   a signal processing unit, connected to both of the two secondary coils, the signal processing unit configured to perform digital signal processing of at least one electrical variable to determine a position and/or a deflection depending on the magnetic coupling between the primary coil and at least the first and second secondary coils, by:
      digitizing electrical signals of the two secondary coils to produce the at least one electrical variable,
      windowing the electrical variable, and
      filtering the windowed electrical variable with a Goertzel filter to determine a magnitude of the electrical variable which indicates the position and/or the deflection between the primary coil and at least the first and second secondary coils.

* * * * *